(12) United States Patent
Stoffel et al.

(10) Patent No.: US 8,636,840 B2
(45) Date of Patent: Jan. 28, 2014

(54) PROCESS FOR UTILIZING ORGANIC WASTE MATERIALS

(75) Inventors: Beat Stoffel, Zumikon (CH); Armando Cruz, Veracruz (MX)

(73) Assignee: Holcim Technology Ltd, Rapperswil-Jona (CH)

( * ) Notice: Subject to any disclaimer, the term of this patent is extended or adjusted under 35 U.S.C. 154(b) by 0 days.

(21) Appl. No.: 13/805,821

(22) PCT Filed: Jun. 22, 2011

(86) PCT No.: PCT/IB2011/001418
§ 371 (c)(1),
(2), (4) Date: Feb. 12, 2013

(87) PCT Pub. No.: WO2011/161525
PCT Pub. Date: Dec. 29, 2011

(65) Prior Publication Data
US 2013/0152826 A1  Jun. 20, 2013

(30) Foreign Application Priority Data

Jun. 22, 2010 (AT) ................ A 1036/2010

(51) Int. Cl.
*C04B 7/44* (2006.01)
*C04B 7/48* (2006.01)

(52) U.S. Cl.
USPC ........... 106/745; 106/739; 106/757; 106/759; 106/764

(58) Field of Classification Search
USPC ........... 106/739, 745, 757, 759, 764
See application file for complete search history.

(56) References Cited

U.S. PATENT DOCUMENTS

| 3,442,498 | A | * | 5/1969 | Davis | 106/697 |
| 4,253,405 | A | * | 3/1981 | Cottrell et al. | 110/222 |
| 5,349,910 | A | * | 9/1994 | Hundebol | 110/346 |
| 2005/0274067 | A1 | | 12/2005 | Morton et al. | |
| 2009/0293303 | A1 | | 12/2009 | Maestri | |
| 2010/0000119 | A1 | | 1/2010 | Ueno et al. | |
| 2010/0058963 | A1 | * | 3/2010 | Saitou et al. | 110/346 |

FOREIGN PATENT DOCUMENTS

| DE | 3542004 A1 | 6/1987 |
| EP | 2039663 A1 | 3/2009 |
| WO | WO 2009105441 A1 * | 8/2009 |

OTHER PUBLICATIONS

International Search Report dated Nov. 29, 2011, issued in international Application PCT/IB2011/001418.

* cited by examiner

*Primary Examiner* — Anthony J Green
(74) *Attorney, Agent, or Firm* — Fitch, Even, Tabin & Flannery LLP

(57) ABSTRACT

In a process for utilizing organic waste materials, in particular cellulose-containing, moist, organic waste materials, in a clinker production process in which the waste materials are introduced as fuel and burnt in the clinker production process, the waste materials are brought into contact with the hot exhaust gases of the clinker production process and dried in a drying step flowing in parallel therewith before they are introduced into the clinker production process. The drying step is carried out in a drying reactor in which the moist waste materials are passed together with the hot exhaust gases through a series of concentrically arranged tubes, with multiple changes in flow direction about 180°, and the temperature of the hot exhaust gases is set to a maximum value of 400° C. by mixing in of ambient air and/or air from the clinker production process before the drying step.

12 Claims, 2 Drawing Sheets

PROCESS FOR UTILIZING ORGANIC WASTE MATERIALS

CROSS-REFERENCE TO RELATED APPLICATIONS

This Application is a U.S. National Stage Application filed under 35 U.S.C. §371 of International Application PCT/IB2011/001418, filed Jun. 22, 2011, designating the United States, which claims priority from Austrian Patent Application A 1036/2010, filed Jun. 22, 2010, the complete disclosures of which are hereby incorporated herein by reference in their entirety for all purposes.

The invention relates to a process for utilizing organic waste materials, in particular cellulose-containing, moist, organic waste materials, in a clinker production process in which the waste materials are introduced as fuel and burnt in the clinker production process.

In the production of cement clinker, cement raw meal is preheated and calcined, during which $CO_2$ escapes. However, the actual burning takes place in a rotary kiln, after which a hydraulic product is obtained by cooling of the burned clinker. In all, considerable amounts of energy are used for these processes, and attempts are constantly being made to recover as much of the expended energy as possible and reuse it in the process as effective as possible. In addition, there are constant attempts to use alternative fuels in the cement clinker production process, that is to say fuels with a lower calorific value than valuable natural gas or mineral oil, whereby alternative fuels of such kind are often available in the form of waste. Besides organic waste materials, such as used tyres, soils that have been contaminated with mineral oil and similar materials, which must be crushed and often pyrolised or gasified as well in order to be able to use the energy content in a clinker production process in the form of synthesis gas, cellulose-containing waste materials also seem promising for the purpose of reducing the need for primary fuel in the cement industry. In paper manufacturing and the coffee and sugar industry, large quantities of pulp are produced as byproducts, and this pulp very often contains substantial quantities of water besides its combustible cellulose content. Other cellulose-containing, moist, organic waste materials of this kind include waste from agricultural operations such as rice husks, residues of palm kernel oil and soybeans, and wood and rapeseed waste.

Until now, some of these cellulose-containing waste materials has been fermented in biogas plants, although most has to be disposed of in landfills. However, in addition to their considerable space requirement, landfills have the disadvantage that groundwater problems and unpleasant odours are making it increasingly difficult to find new sites for possible use as landfills.

Because of the significant recycling potential of the cement industry as a channel for reusing such cellulose-containing waste materials, in some regions businesses that produce such waste materials have formed in the vicinity of cement production facilities in order to be able to take advantage of a favourable channel for disposing the cellulose-containing waste materials.

Previously, however, the potential for recycling such waste materials in the cement industry was limited due to their substantial moisture content, since the waste materials were introduced directly into the burner installations, and the water content thereof resulted in a need for more heat in the clinker production process in order to evaporate the water. In addition, the substantial quantities of water that are introduced after the water is evaporated results in an unfavourably large volume of total process exhaust gases, which in turn brings forth a greater expense for waste gas management. On the other hand, precisely the mentioned cellulose-containing waste materials are considered to be a favourable alternative fuel for the cement industry, since these materials would be relatively useful in the overall process because of their low chlorine and sulphur content.

The object of the present invention is therefore to improve a process of the kind described above in such manner that the water content of the cellulose-containing, moist organic waste materials is reduced, in order to avoid the cited drawbacks that are associated with a high water content. At the same time, it is intended that the thermal potential that exists in these waste materials should be used as completely as possible and the need to dump the materials should be largely eliminated.

SUMMARY OF THE INVENTION

In order to solve this object, a process of the type described above is developed according to the invention to such end that the waste materials are brought into contact with the hot exhaust gases of the clinker production process and dried in a drying step flowing in parallel therewith before they are introduced into the clinker production process, and that the drying step is carried out in a drying reactor in which the moist waste materials are passed together with the hot exhaust gases through a series of concentrically arranged tubes, with multiple changes in flow direction about 180°, and the temperature of the hot exhaust gases is set to a maximum value of 400° C. by mixing in ambient air and/or air from the clinker production process before the drying process. Accordingly, in the process according to the invention the large quantities of heat that are contained in the hot exhaust gases from the clinker production process are thus used to dry the moist, cellulose-containing waste materials, wherein according to the invention the hot exhaust gases are forwarded to a drying step in a process flow in parallel therewith. As the moist waste materials are moved in parallel flow with the hot exhaust gases from the clinker production process, these gases are cooled during the drying process, so it is possible to avoid exposing cellulose fractions that have already undergone relatively extensive drying to high temperatures, which in turn helps to avoid the formation of volatile organic compounds (VOC) or odours in the exhaust gas due to overheating of the organic substances.

DETAILED DESCRIPTION OF THE INVENTION

Figure 1:
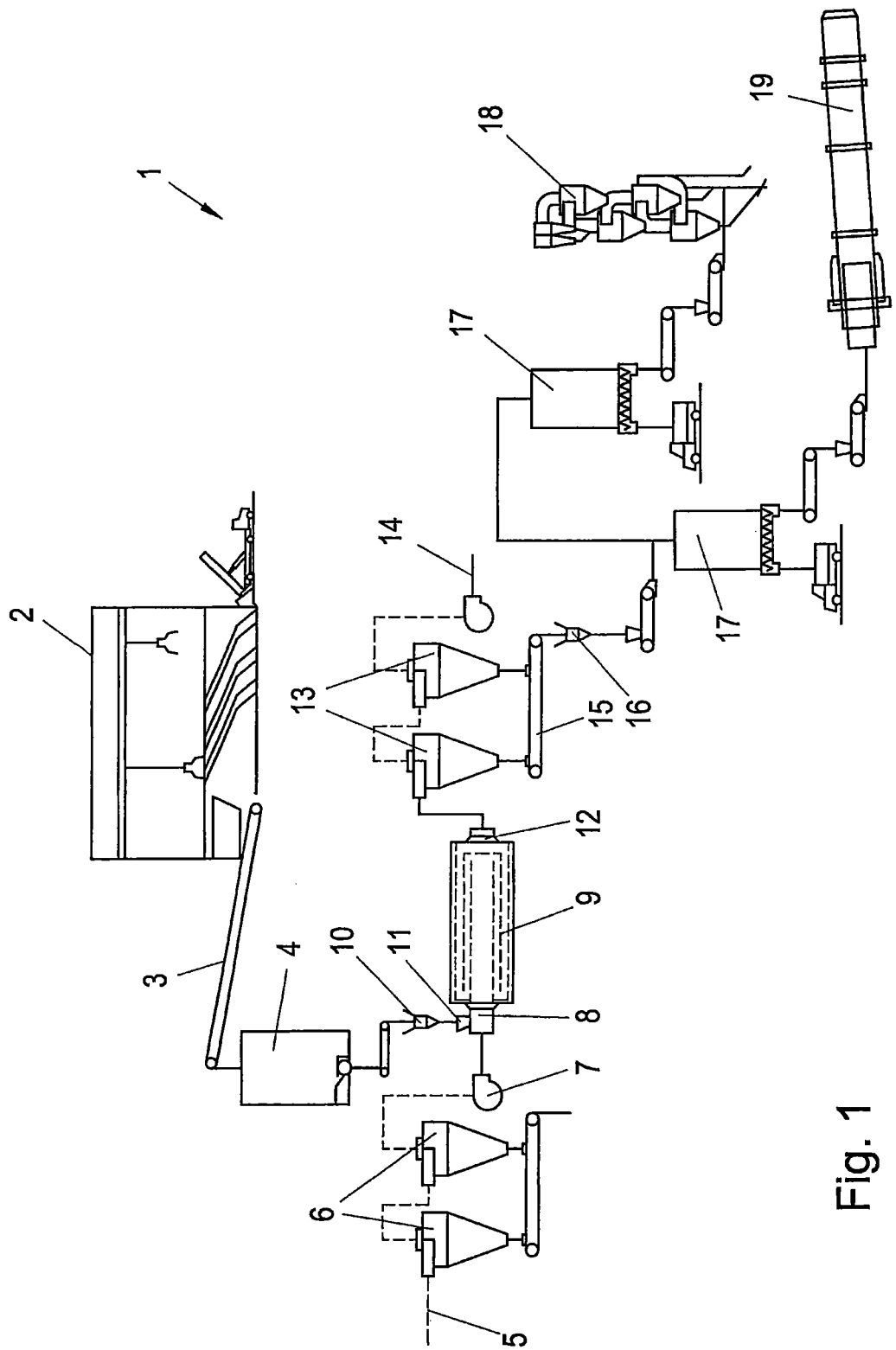
FIG. 1 illustrates a system for carrying out a process according to the invention.

In a present process for utilizing organic waste in a clinker production process that generates hot exhaust gases, the waste materials are introduced as fuel and burnt in the clinker production process. The waste materials comprise cellulose-containing, moist, organic waste materials. The waste materials are brought into contact with the hot exhaust gases of the clinker production process and dried in a drying step flowing in parallel therewith before they are introduced into the clinker production process. A present process is characterised in that the drying step is carried out in a drying reactor in which the moist waste materials are passed together with the hot exhaust gases through a series of concentrically arranged tubes, with multiple changes in flow direction about 180°, and by setting a maximum temperature of the hot exhaust gases to a maximum value of 400° C. by mixing in ambient air and/or air from the clinker production process before the drying process.

Due to the very high water content that is normally present in moist, cellulose-containing waste materials, the drying step using the hot exhaust gases from the clinker production process must be carried out over a relatively prolonged period. The drying step is therefore carried out in a drying reactor in which the moist waste materials are passed through a series of concentrically arranged tubes, including several 180° changes in the flow direction, together with the hot exhaust gases. When a drying reactor of this kind is used, a relatively long residence time in a relatively compact drying reactor is possible, and the changes in direction of the material flow, which are made around the edges of the concentrically arranged tubes, serve to crush the waste materials for drying and mix them more thoroughly with the hot exhaust gases. The reactor can also be operating in rotating mode, and other installations for mixing and crushing the flow of material are also conceivable. Clinker production processes are decidedly energy-intensive, so processes of this kind also produce large quantities of hot exhaust gases. However, the process according to the invention has been refined advantageously to the effect that the exhaust gases from the clinker cooler and/or the preheater are used as the hot exhaust gases, at which points the hot exhaust gases are particularly easily extracted.

In order to ensure a sufficiently large ratio of surface area to volume of the solid components of the moist, cellulose-containing waste materials, according to a preferred embodiment, the process according to the invention is refined to such effect that the waste materials are crushed before the drying step.

As was indicated previously, with the process according to the invention, in which the cellulose-containing waste materials and the hot exhaust gases are circulated in parallel, the formation of volatile organic compounds and objectionable odours can be largely prevented. In order to maximise this effect, the process according to the present invention is carried out in such manner that the temperature of the hot exhaust gases is set to a maximum value of 400° C. by mixing in ambient air and/or air from the clinker production process before the drying step to reliably prevent the organic waste materials from being overheated.

The same purpose is served by the preferred measure of setting the temperature of the hot exhaust gases to a maximum value of 150° C. at the end of the drying step by controlling the flow thereof through the drying reactor, wherein the considerably lower temperature is necessary at the end of the drying step because the dried, cellulose-containing waste materials are much more susceptible to thermal decomposition reactions than the waste materials in the moist state, the condition they show before the drying step. A corresponding controller for the flow of the materials through the drying reactor that is capable of controlling the residence time and/or the ratio of gas flow to material flow, that is to say the flow of waste materials and therewith also the cooling of the exhaust gases in the drying reactor, may be used to set the maximum value of the exhaust gases at the end of the drying step.

According to a preferred embodiment of the present invention, the process may be carried out in such manner that the mixture of gas and dried waste materials that leaves the drying reactor is separated, so that the hot exhaust gases from the clinker production process, that are used for the drying, are passed to an exhaust gas treatment stage, which will be discussed hereafter, and the dried waste materials are stored or may be transported in simple manner before their subsequent reuse and particularly their combustion in the clinker production process.

As was indicated previously, it is normally necessary to pass the hot exhaust gases to an exhaust gas treatment stage after the drying step. In this context, the process is preferably refined to the effect that at least a portion of the gases leaving the drying reactor is forwarded for dedusting. Alternatively, however, in this context the process according to the invention may also be refined to the effect that at least a portion of the gases leaving the drying reactor is returned to the clinker production process as combustion air. In both cases, any unpleasant odours or fine dust that may be generated during the drying process are effectively prevented from escaping into the atmosphere.

A further favourable option for reusing the gases that leave the drying reactor is made possible according to a preferred embodiment of the present invention in that at least a portion of the gases leaving the drying reactor is recirculated into the drying reactor, wherein, if the fraction of recirculated gases present in the drying reactor is selected appropriately, it is possible to achieve the setting of the maximum temperature value of the exhaust gases before the drying step as described previously.

If the exhaust gases are to be returned to the clinker production process as combustion air, the process according to the invention may preferably be developed further to the effect that, the gases extracted from the drying reactor are fed to a condenser for drying.

In order to be able to use the dried alternative fuels effectively and controllably in a clinker production process, an even burn-off and thus an even and calculable heat emission must be assured. According to a preferred embodiment of the present invention, the process is therefore developed to such effect that the dried waste materials undergo a crushing step. In this way, it is ensured that the waste materials may be forwarded for combustion uniformly, so that no slow burning clumps of waste materials are introduced, although if the drying is effective and the crushing sufficient the remains of the cellulose may also be blown into the clinker production process.

In the following, the invention will be explained in greater detail with reference to an embodiment that is represented schematically in the drawing. In the drawing, FIG. 1 shows a general process diagram of the process according to the invention, and FIG. 2 is a partially cutaway schematic representation of a drying reactor for use in implementing the process according to the invention.

In FIG. 1, reference sign 1 designates a system for carrying out the process according to the invention. The waste materials are stored temporarily in a receiving unit 2 for collecting the cellulose-containing waste materials, and then forwarded to a crushing device 4 via a conveyor belt 3. Hot exhaust gas from the clinker production process is forwarded via line 5 indicated with a dashed line to cyclones 6 for the removal of suspended matter and is then forwarded to the exhaust gas intake 8 of the drying reactor 9 via a fan 7. The crushed waste materials are delivered to the material feeding point 11 of the drying reactor, where the drying takes place, via a metering unit 10. Reference sign 12 designates the discharge from drying reactor 9, which is followed by cyclones 13 for separating the mixture of gas and dried waste materials. Following optional drying in a condenser, the exhaust gases may be dedusted and allowed to escape into the atmosphere through a gas discharge unit 14, or, as was described previously, they may be returned to the clinker production process. It is also conceivable to return the gases to drying reactor 9 for use in setting the temperature of the hot exhaust gases before the drying step as part of the process according to the invention.

The dried waste materials are distributed to various bunkers 17 via a transport device, in this case a conveyor belt 15 and a crushing and metering station 16, from which bunkers they may be fed for example to calciner 18 or a rotary kiln 19 of a clinker production process.

Figure 2:
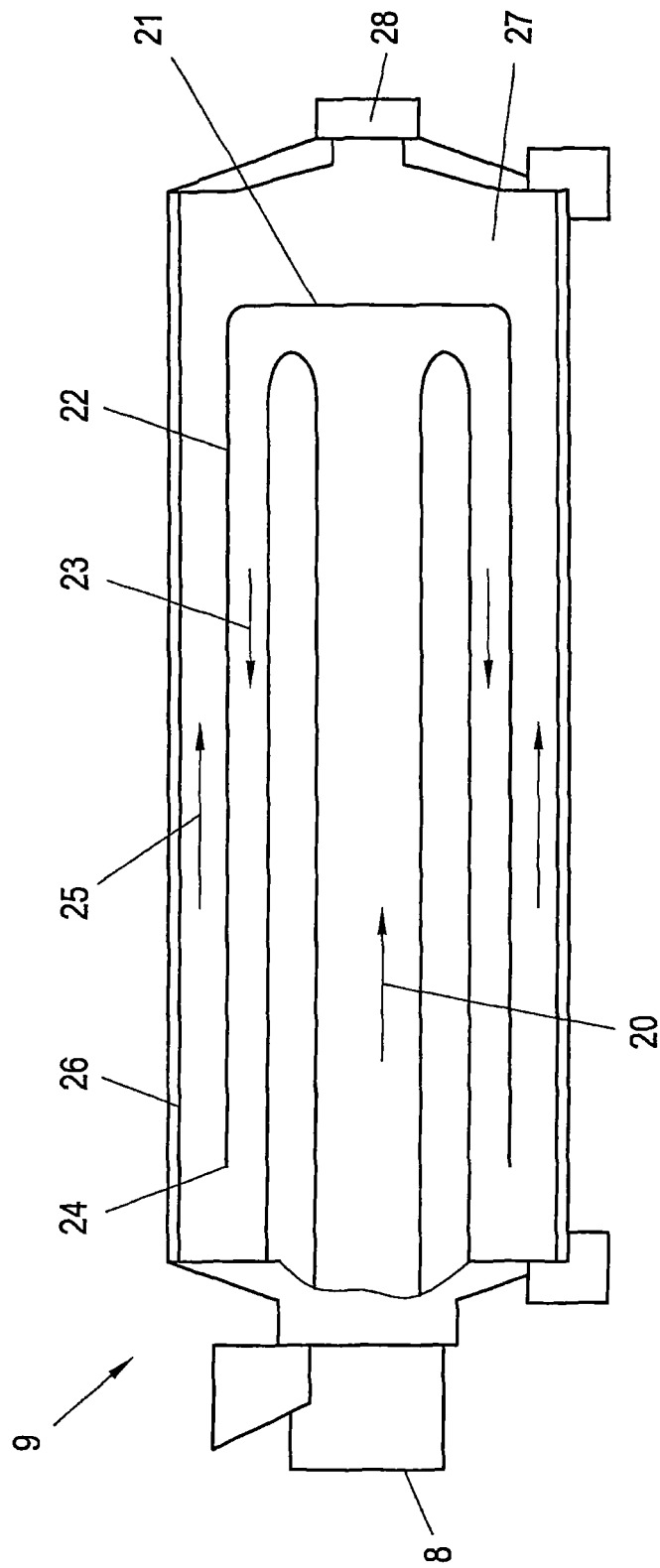
FIG. 2 illustrates an exhaust gas inlet and a drying reactor and flow of a mixture of hot exhaust gases from a clinker production process and cellulose waste-containing materials for drying.

FIG. 2 represents the exhaust gas inlet 8 and the drying reactor 9, wherein it is shown that the mixture of hot exhaust gases from the clinker production process and cellulose-containing waste materials for drying advances in the direction indicated by arrow 20 through an internal pipe. At the first reversing point 21 the mixture enters an annulus that is delimited by another pipe 22 arranged concentrically with and radially outside of the first pipe, wherein the material flow is turned about 180° in the direction of arrow 23. At another reversing point 24, the material flow is reversed again, so that the flow now advances in the direction of arrow 25, into an annulus that is disposed radially outwardly and delimited by another pipe 26. At outlet end 27 of the drying reactor 9, the mixture of exhaust gases and dried waste materials is discharged at outlet 28, the waste materials being destined for further processing as described with reference to FIG. 1.

The invention claimed is:

1. A process for utilizing organic waste in a clinker production process that generates hot exhaust gases in which the waste materials are introduced as fuel and burnt in the clinker production process, wherein the waste materials comprise cellulose-containing, moist, organic waste materials and said waste materials are brought into contact with the hot exhaust gases of the clinker production process and dried in a drying step flowing in parallel therewith before they are introduced into the clinker production process, characterised in that the drying step is carried out in a drying reactor in which the moist waste materials are passed together with the hot exhaust gases through a series of concentrically arranged tubes, with multiple changes in flow direction about 180°, and by setting a maximum temperature of the hot exhaust gases to a maximum value of 400° C. by mixing in ambient air and/or air from the clinker production process before the drying process.

2. The process according to claim 1, characterised in that in the clinker process a clinker cooler generates exhaust gases and a preheater generates exhaust gases, and the exhaust gases from the clinker cooler and/or the preheater are used as the hot exhaust gases.

3. The process according to claim 1, characterised in that the waste materials are crushed before the drying step.

4. The process according to claim 1, characterised in that the temperature of the hot exhaust gases at the end of the drying step is set to a maximum value of 150° C. by controlling the flow through the drying reactor.

5. The process according to claim 1, characterised in that the mixture of gas and dried waste materials is separated when it leaves the drying reactor.

6. The process according to claim 1, characterised in that at least a portion of the gases from the drying reactor is forwarded to a dedusting stage.

7. The process according to claim 1, characterised in that at least a portion of the gases from the drying reactor is forwarded to the clinker production process as combustion air.

8. The process according to claim 1, characterised in that at least a portion of the gases from the drying reactor is recirculated to the drying reactor.

9. The process according to claim 1, characterised in that the gases discharged from the drying reactor are forwarded to a condenser for drying.

10. The process according to claim 1, characterised in that the dried waste materials undergo crushing.

11. The process according to claim 1, characterised in that in the clinker process a clinker cooler generates exhaust gases and the exhaust gases from the clinker cooler are used as the hot exhaust gases.

12. The process according to claim 1, characterised in that in the clinker process a preheater generates exhaust gases, and the exhaust gases from the preheater are used as the hot exhaust gases.

\* \* \* \* \*